(12) United States Patent
Stählin et al.

(10) Patent No.: US 8,710,978 B2
(45) Date of Patent: Apr. 29, 2014

(54) METHOD AND APPARATUS FOR COMMUNICATION

(75) Inventors: Ulrich Stählin, Eschborn (DE); Adam Swoboda, Groß-Gerau (DE); Thomas Grotendorst, Eschborn (DE); Christian Thur, Wiesbaden (DE)

(73) Assignee: Continental Teves AG & Co. oHG (DE)

( * ) Notice: Subject to any disclaimer, the term of this patent is extended or adjusted under 35 U.S.C. 154(b) by 44 days.

(21) Appl. No.: 13/375,950

(22) PCT Filed: May 28, 2010

(86) PCT No.: PCT/EP2010/057501
§ 371 (c)(1),
(2), (4) Date: Jun. 27, 2012

(87) PCT Pub. No.: WO2010/139649
PCT Pub. Date: Dec. 9, 2010

(65) Prior Publication Data
US 2012/0268293 A1   Oct. 25, 2012

(30) Foreign Application Priority Data
Jun. 4, 2009 (DE) .......................... 10 2009 026760

(51) Int. Cl.
*G08B 1/08* (2006.01)
*G08G 1/00* (2006.01)

(52) U.S. Cl.
USPC ................... 340/539.1; 340/539.21; 340/902; 340/991

(58) Field of Classification Search
USPC ......... 340/901–903, 905, 917, 928, 933, 935, 340/937, 426.1, 426.13, 438, 439, 990, 991, 340/992, 994, 539.1, 539.21, 539.22, 340/539.23, 539.26; 455/107, 426.1, 446, 455/447; 700/300; 701/1, 41, 70
See application file for complete search history.

(56) References Cited

U.S. PATENT DOCUMENTS 5,465,390 A   11/1995   Cohen
(Continued)

FOREIGN PATENT DOCUMENTS

DE   102008036131 A1   3/2009
WO   WO 2010/004443 A1   1/2010

OTHER PUBLICATIONS

International Application Serial No. PCT/EP2010/057501, International Search Report mailed Nov. 5, 2010, 6 pgs.
Wewetzer Christian, "Experimental Evaluation of UMTS and Wireless LAN for Inter-Vehicle Communication", Telecommunications, ITST, 7th International Conference on ITS. (Jun. 1, 2007), 6 pgs.
(Continued)

*Primary Examiner* — Van T. Trieu
(74) *Attorney, Agent, or Firm* — RatnerPrestia

(57) ABSTRACT

The invention relates to a method for a vehicle to communicate with another vehicle or with an infrastructure device which has a particular range which is dependent on the current position of the vehicle. In order to ensure correct operation of the communication, the range to be expected for the communication is derived inter alia from the nature of the surroundings, which is dependent on the current position of the vehicle. The invention also relates to an appropriate apparatus for communication.

15 Claims, 1 Drawing Sheet

(56) References Cited

U.S. PATENT DOCUMENTS

| | | | |
|---|---|---|---|
| 6,477,376 B1 | 11/2002 | Carter | |
| 6,791,471 B2 * | 9/2004 | Wehner et al. | 340/903 |
| 7,313,467 B2 * | 12/2007 | Breed et al. | 701/1 |
| 7,944,340 B1 * | 5/2011 | Ghabra et al. | 340/12.22 |
| 8,041,469 B2 * | 10/2011 | Kellum et al. | 700/300 |
| 8,060,260 B2 * | 11/2011 | Huang et al. | 701/1 |
| 2002/0029108 A1 | 3/2002 | Liu et al. | |
| 2005/0137786 A1 | 6/2005 | Breed | |
| 2010/0245123 A1 * | 9/2010 | Prasad et al. | 340/870.41 |

OTHER PUBLICATIONS

Ammoun, Samer, "Performance Analysis of Intervehicle Communication for Collaborative Traffic Applications", Telecommunications, ITST, 7th International Conference on ITS, (Jun. 1, 2007), 6 pgs.

Ammoun, S., "Crossroads Risk Assessment Using GPS and Inter-Vehicle Communications", Intelligent Transport Systems, IET, vol. 1, No. 2, (Jun. 11, 2007), 95-101.

German Search Report Application Serial No. DE 10 2010 029 483.7, mailed Nov. 17, 2010, 3 pgs.

* cited by examiner

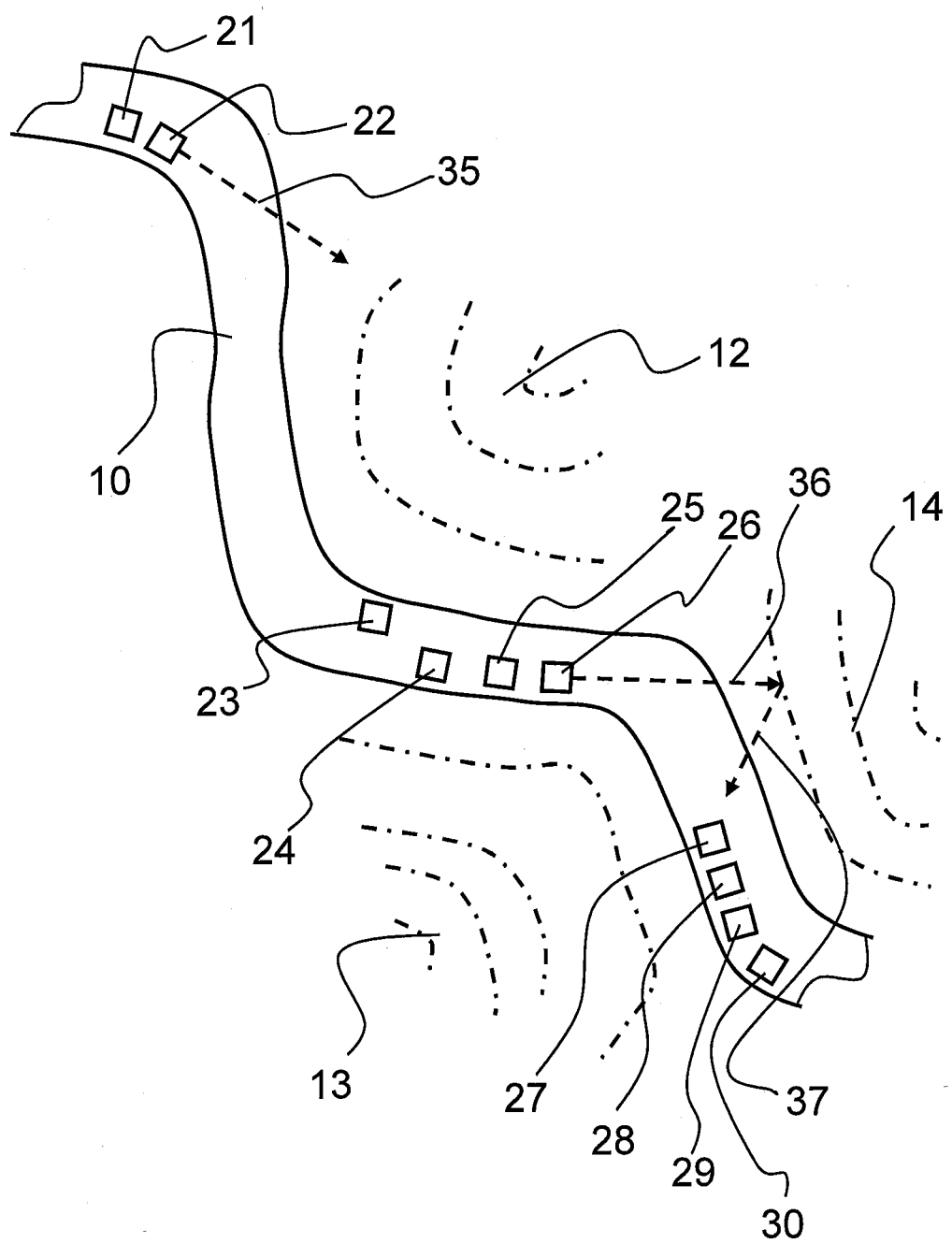

METHOD AND APPARATUS FOR COMMUNICATION

CROSS REFERENCE TO RELATED APPLICATIONS

This application is the U.S. National Phase Application of PCT/EP2010/057501, filed May 28, 2010, which claims priority to German Patent Application No. 10 2009 026 760.3, filed Jun. 4, 2009, the contents of such applications being incorporated by reference herein.

FIELD OF THE INVENTION

The present invention relates to a method for a vehicle to communicate with another vehicle or with an infrastructure device which has a particular range which is dependent on the current position of the vehicle. The present invention also relates to an appropriate apparatus for communication.

BACKGROUND OF THE INVENTION

In future, vehicle-to-vehicle communication (subsequently C2C communication for short) and vehicle-to-infrastructure communication (subsequently C2I communication for short) will become ever more significant for controlling vehicles, particularly for driving-safety and driving-assistance systems. C2C communication and C2I communication are subsequently combined using the term C2X communication.

For the control and the driving-safety and driving-assistance systems which use C2X communication to work correctly, it is necessary to have the most precise possible knowledge of the range of C2X communication, that is to say the range of the radio waves, or electromagnetic waves in a different wavelength range, which are used for the communication. The range denotes the maximum distance between transmitter and receiver at which communication between transmitter and receiver is still possible.

In connection with GPS communication, the document US 2005/0137786 A1, which is incorporated by reference, describes the fact that, to improve communication, heavy goods vehicles need to be prohibited by law from traveling on both sides of a car. In addition, in the event of permanent heavy attenuation of the GPS signal on account of travel through a tunnel or in the center of a large city, this can be rectified with the use of driver systems. In addition, the known system has a diagnosis system which verifies whether the system is operating correctly. These proposals for improvement, the underlying problem for which involves insufficient range of communication, address the problems outlined in the preceding paragraph only in part.

SUMMARY OF THE INVENTION

The object of the present invention is therefore to specify a simple method and to provide an inexpensive apparatus which can be used to continually ensure that the system has the correct functionality on the basis of monitoring of the range.

The above object is achieved by a method having a vehicle to communicate with another vehicle or with an infrastructure device which has a particular range which is dependent on the current position of the vehicle, wherein the range of the communication is derived inter alia from the nature of the surroundings which is dependent on the current position of the vehicle.

In particular, the range which can be expected for the communication is derived inter alia from the nature of the surroundings, which is dependent on the current position of the vehicle.

The invention specified above is based on the use of the inherently known fact that the range of C2X communication is dependent on the nature of the surroundings. This relationship is used to estimate the range of the C2X communication and hence to estimate the functionality of the system. The term "nature of the surroundings" used below covers the geographical nature of the surroundings of the current position of the vehicle, that is to say the surface profile of the surroundings or the water coverage, the vegetation in the surroundings, the development structure and also weather influences such as rain or snow, etc. In this context, the development structure includes the number and arrangement of buildings or other structures such as tunnels and also the size and height thereof. The nature of the surroundings determines the attenuation of the radio waves, or waves in another range of the spectrum, used for the communication and hence the range of said waves. This phenomenon is also called free-space attenuation.

The nature of the surroundings also includes static and dynamic components. The development in the surroundings of the current position of the vehicle or the weather can change dynamically, whereas the surface profile of the surroundings of the current position of the vehicle, for example, should remain essentially unchanged, that is to say static.

Model calculations can then be used to ascertain the range which can be expected for the C2X communication from the nature of the surroundings. This expected range can then be indicated to the driver, or it is possible, particularly in the case of a particularly short range below a prescribed range threshold value, for a warning to be output to the driver to indicate that the system is currently not functional or has restricted functionality. The information regarding the range which is ascertained from the nature of the surroundings can furthermore be used in the vehicle to customize the systems in the vehicle which use C2X communication as appropriate. By way of example, it is thus possible for recognition thresholds to be chosen to be lower for a short range. Alternatively or in addition, it would also be possible for the transmission power of the transmitter or the sensitivity of the receiver to be corrected as appropriate for a particularly short or long range.

In order to ascertain the current position of the vehicle, a global positioning system, particularly a satellite navigation system such as GPS, Galileo, GLONASS (Russia), Compass (China), IRNSS (India), etc., is frequently used. It is likewise possible to use a local positioning system.

By way of example, the vehicle is a motor vehicle, such as a car, bus or heavy goods vehicle, or else a rail vehicle, a ship, aircraft, such as a helicopter or airplane, or a bicycle, for example.

In one exemplary embodiment of the present invention, the nature of the surroundings, which is dependent on the current position of the vehicle, can be captured by means of at least one ambient sensor. This capture is particularly advantageous for the dynamically changing components of the nature of the surroundings. In the ambient sensors, it is possible for electromagnetic waves from any wavelength range, that is to say light waves, infrared waves, radio waves and/or ultrasonic waves, to be used to analyze the surroundings of the current position of the vehicle.

As an alternative or in addition, the nature of the surroundings, which is dependent on the current position of the vehicle, can be ascertained from a digital map stored in the vehicle or from a digital map which is accessible via the infrastructure device. In the latter case, the digital map may be stored on a central server. This opportunity for ascertaining information about the nature of the surroundings is beneficial particularly for static components thereof, for example geographical information.

In the case of the present invention, the term "digital map" is understood to mean not only maps available in digital form for a local or global navigation system but also maps for advanced driving assistance systems (ADAS, Advanced Driver Assistance Systems), without any navigation taking place.

The precision of the determination of the range of the communication can be increased by additionally deriving the range from at least one value—stored in the vehicle—for the range, said value having been ascertained during an earlier residence at the current position of the vehicle. In one exemplary embodiment, the at least one stored value for the range is the maximum of all values for the range which have been ascertained during earlier residences at the current position. This latter procedure allows computation time and memory space to be saved, since only a single value for a current position is processed or stored in each case. In a further exemplary embodiment, the respective range values can be stored in combination with a time stamp, wherein the time stamp includes the date and possibly the time of day when reaching the relevant range of communication at the respective position. The ranges are then stored only over a predetermined period in each case so as to keep only up-to-date data in each case. Accordingly, only maximum ranges are then used in the calculation of a range which is to be expected, said maximum ranges being no older than a prescribed threshold value.

In order to ascertain the range from an earlier time, it is also possible to use data from the communication, e.g. the maximum distance of the communication partner. These range data ascertained in this manner can furthermore be evaluated separately in respect of the point of the compass or the course of the road.

When determining the range of the communication, it should also be borne in mind that the radiation characteristic of the vehicle is typically not the same in all directions of the space. Depending on the antenna position, particularly the ranges in the direction of travel and contrary to the direction of travel of the vehicle differ. Accordingly, in one preferred exemplary embodiment of the present invention, the range of the communication is additionally derived from the radiation characteristic of the respective vehicle.

To simplify the calculation, the nature of the surroundings can be classified into a plurality of classes of surroundings which have a respective associated range that can be expected. The following are conceivable examples of classes of surroundings:

Flat land,
Undulating land,
Mountainous land,
Woodland,
Urban, little development,
Urban, very high level of development.

The indicated classes of surroundings are not conclusive; other classes can be defined in arbitrary number. In addition to the class of surroundings, the ranges can also be distinguished in reference to the vehicle model.

In order, in one exemplary embodiment, to ascertain the range that is to be expected for the respective class of surroundings and possibly additionally for each vehicle model, simulations are performed for the respective classes of surroundings, for example during the development of a vehicle model. Alternatively, journeys can also be made in reference surroundings and in this case the ranges that are to be expected can be determined. These values are then each stored in the vehicle before it is delivered or, if necessary, new values are loaded at a servicing appointment. If no distinction is additionally made on the basis of vehicle model, the range values ascertained for different vehicle models could be averaged for a class of surroundings.

The above object is also achieved by an apparatus having the features of an apparatus for a vehicle to communicate with another vehicle or with an infrastructure device, wherein the communication has a particular range which is dependent on the current position of the vehicle, wherein the range of the communication can be derived inter alia from the nature of the surroundings, which is dependent on the current position of the vehicle.

The apparatus according to aspects of the invention is distinguished particularly in that the range that is to be expected for the communication can be derived inter alia from the nature of the surroundings, which is dependent on the current position.

The developments of the apparatus according to aspects of the invention which are specified in the dependent claims have the properties and advantages which are cited above in respect of the method according to aspects of the invention.

In a further exemplary embodiment, in the event of a drop below a prescribed threshold value for the range of the communication, it is signaled to the driver that the apparatus is not functional or has only restricted functionality. This can be done by a visual or audible signal, for example.

Further advantages, features and opportunities for application of the present invention also arise from the description of exemplary embodiments below and the single FIGURE. In this case, all features described and/or graphically shown form the subject matter of the present invention, including irrespective of the combination of said features in the claims or the back-references therein.

The invention is explained below with reference to C2C communication. Similarly, it can also be implemented for C2I communication. In this case, the infrastructure devices used are traffic lights, road signs, display panels or the like, for example.

BRIEF DESCRIPTION OF THE DRAWINGS

The invention is best understood from the following detailed description when read in connection with the accompanying drawings. Included in the drawings is the following FIGURE:

FIG. 1 shows a first, a second and a third exemplary embodiment of the method according to aspects of the invention.

DETAILED DESCRIPTION OF THE PREFERRED EMBODIMENTS

A road 10, which has a very large number of curves, carries vehicles 21, 22, 23, 24, 25, 26, 27, 28, 29 and 30, for example cars, motorcycles or heavy goods vehicles. The nature of the surroundings is also characterized by three elevations 12, 13 and 14 arranged next to the road 10. The elevations (hills, mountains) 12, 13 and 14 are indicated by altitude lines (dot-dash lines).

The vehicle 22 could now communicate with the vehicles 23, 24, 25, 26, 27, 28, 29 and 30 which are in front of it, for example in reference to a queue situated ahead, the end of which is formed by the vehicles 27 to 30, for example.

The radiation characteristic of the vehicle 22 is characterized particularly by radiation of the radio waves which is oriented forward in the direction of travel (illustrated by arrow 35). In the case of the exemplary embodiment shown in FIG. 1, the radio waves for the C2C communication, which are emitted predominantly in the direction of travel of the vehicle 22, hit the elevation 12, however. The data concerning the elevation 12 could be obtained by the vehicle from a digital map stored in the vehicle, for example. Alternatively, the data concerning the elevation 12 could also be determined from measured values from a radar sensor arranged in the vehicle. From the dimensions of the elevation 12 and the situation thereof relative to the road or relative to the direction of movement of the vehicle, the range for the communication with the vehicles 23-30 is classified as short, for example it may be a few meters. The range to be expected is therefore below a prescribed threshold value. Accordingly, it is indicated to the driver that the C2C communication and accordingly the queue indicator arranged in the vehicle are working only to a restricted extent. It is therefore not to be expected that the vehicle 22 will communicate with the vehicles 27 to 30, which could provide the vehicle 22 with the information about the queue.

By contrast, in a second exemplary embodiment, the waves transmitted predominantly in the direction of travel (illustrated by arrow 36) from the C2C communication transmitter in the vehicle 26 are reflected by the elevation 14 (illustrated by arrow 37). The electromagnetic waves used for the C2C communication in the vehicle 26 therefore have a greater range on account of the nature of the elevation 14 than the waves in the C2C communication by the vehicle 22. The structure of the elevation 14 can be ascertained in a similar manner to the first exemplary embodiment using a digital map stored in the vehicle or by an ambient sensor. The range of the C2C communication by the vehicle 26 is calculated taking account of the surface profile of the surroundings of the vehicle 26 and hence taking account of the elevation 14. The range to be expected for the C2C communication is so long that there is no indication regarding restricted or lack of C2C communication. Normally, an end of queue warning formed by the vehicles 27 to 30 will therefore be transmitted to the driver of the vehicle 26 in advance.

In a third exemplary embodiment, the apparatus according to aspects of the invention recognizes from the current position of the vehicles 21 to 30 and the height of the elevations 12 to 14 that these are in hilly land. As a result, the class of surroundings "hilly land" is ascertained for them. For each class of surroundings, the vehicles 22 and 26 have stored a value which is to be expected for the range and which is also possibly specific to the respective vehicle model. Depending on whether the stored value of the range is below a prescribed threshold value, the driver is issued a warning that only restricted or no C2C communication is taking place.

LIST OF REFERENCE SYMBOLS

10 Road
12, 13, 14 Elevation
21, 22, 23 Vehicle
24, 25, 26 Vehicle
27, 28, 29 Vehicle
30 Vehicle
35, 36, 37 Main Direction of Propagation of the Waves in the C2C Communication

The invention claimed is:

1. A method for a vehicle to communicate with another vehicle or with an infrastructure device which has a particular range which is dependent on the current position of the vehicle, the method comprising:
   determining a nature of surroundings of the vehicle at the current position of the vehicle by using map data or radar;
   determining a range of the communication based on the nature of the surroundings; and
   warning a driver of the vehicle that communication to the other vehicle or the infrastructure is restricted when the range is less than a range threshold.

2. The method as claimed in claim 1, wherein the nature of the surroundings, which is dependent on the current position of the vehicle, is captured by means of at least one ambient sensor.

3. The method as claimed in claim 1, wherein the nature of the surroundings, which is dependent on the current position of the vehicle, is ascertained from a digital map stored in the vehicle or from a digital map which is accessible via an infrastructure device.

4. The method as claimed in claim 1, wherein the range of the communication is additionally derived from at least one value-stored in the vehicle for the range, said value having been ascertained during an earlier residence at the current position of the vehicle.

5. The method as claimed in claim 4, wherein the at least one stored value for the range is the maximum of all values for the range which have been ascertained during earlier residences at the current position.

6. The method as claimed in claim 1, wherein the range of the communication is additionally derived from the radiation characteristic of the respective vehicle.

7. The method as claimed in claim 1, wherein the nature of the surroundings is classified into a plurality of classes of surroundings.

8. An apparatus for a vehicle to communicate with another vehicle or with an infrastructure device, including:
   a processor configured to:
      determine a nature of surroundings of the vehicle at the current position of the vehicle by using map data or radar;
      determine a range of the communication based on the nature of the surroundings; and
      warn a driver of the vehicle that communication to the other vehicle or the infrastructure is restricted when the range is less than a range threshold.

9. The apparatus as claimed in claim 8, wherein the nature of the surroundings, which is dependent on the current position of the vehicle, can be captured by means of at least one ambient sensor.

10. The apparatus as claimed in claim 8, wherein the nature of the surroundings, which is dependent on the current position of the vehicle, can be ascertained from a digital map stored in the vehicle or from a digital map which is accessible via the infrastructure device.

11. The apparatus as claimed in claim 8, wherein the range of the communication can additionally be derived from at least one value-stored in the vehicle for the range, said value having been ascertained during an earlier residence at the current position of the vehicle.

12. The apparatus as claimed in claim 11, wherein the at least one stored value for the range is the maximum of all values for the range which have been ascertained during earlier residences at the current position.

13. The apparatus as claimed in claim 8, wherein the range of the communication can additionally be derived from the orientation of the antenna which is used for the communication.

14. The apparatus as claimed in claim 8, wherein the nature of the surroundings can be classified into a plurality of classes of surroundings.

15. The apparatus as claimed in claim 8, wherein in the event of a drop below a prescribed threshold value for the range of the communication, it is signaled to the driver of the vehicle that the apparatus is not functional.

* * * * *

UNITED STATES PATENT AND TRADEMARK OFFICE
CERTIFICATE OF CORRECTION

PATENT NO.        : 8,710,978 B2                                         Page 1 of 1
APPLICATION NO. : 13/375950
DATED             : April 29, 2014
INVENTOR(S)       : Stählin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 247 days.

Signed and Sealed this

Twenty-ninth Day of September, 2015

Michelle K. Lee
*Director of the United States Patent and Trademark Office*